Jan. 29, 1963   B. DIGGINS   3,075,815
JOURNAL STOP
Filed March 26, 1957   2 Sheets-Sheet 1
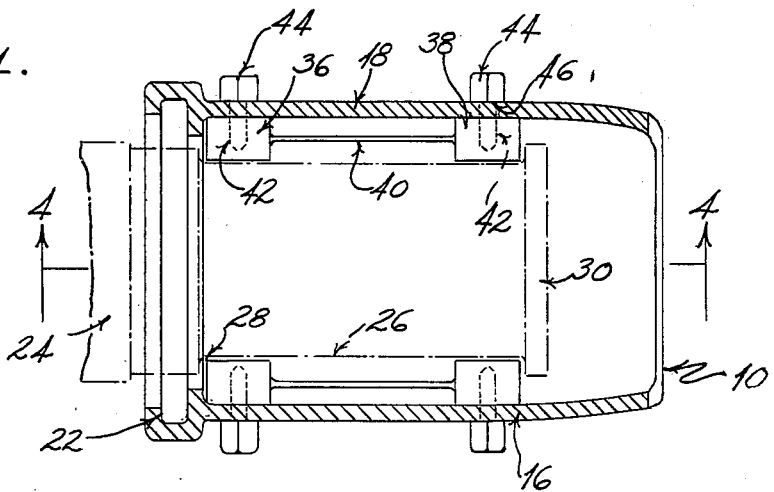
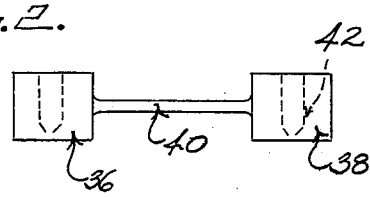
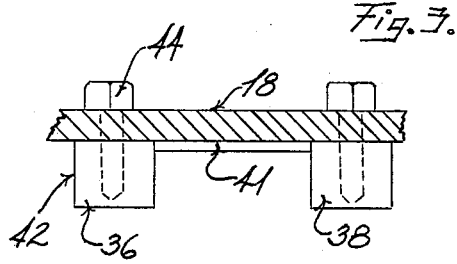
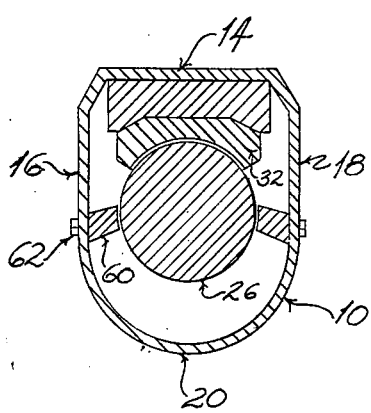
INVENTOR
BARTHOLOMEW DIGGINS
BY Diggins & LeBlanc
ATTORNEYS Jan. 29, 1963  B. DIGGINS  3,075,815
JOURNAL STOP
Filed March 26, 1957  2 Sheets-Sheet 2
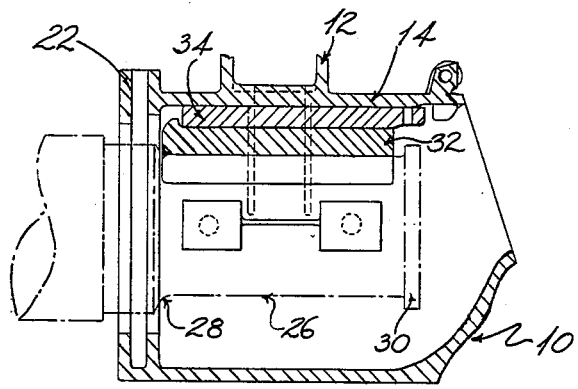
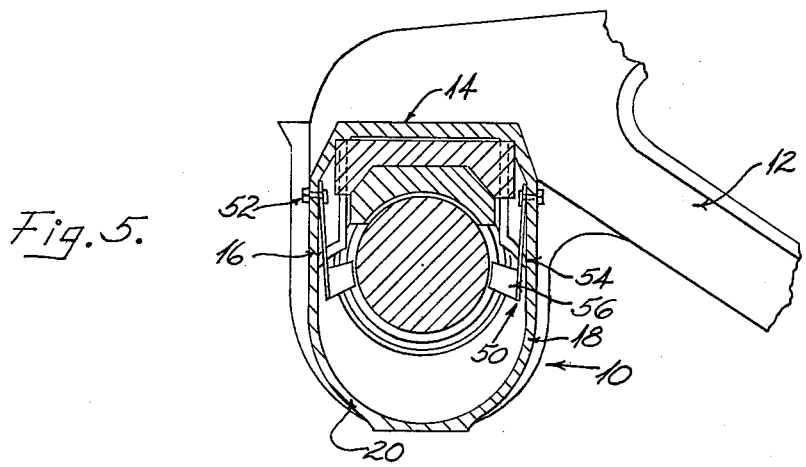
INVENTOR
BARTHOLOMEW DIGGINS
BY Diggins & LeBlanc
ATTORNEYS

3,075,815
JOURNAL STOP
Bartholomew Diggins, Rock Creek Hills, Md., assignor to Stanley G. Bair, Chicago, Ill.
Filed Mar. 26, 1957, Ser. No. 648,692
4 Claims. (Cl. 308—40)

The present invention relates to journal stops, that is, to stops which limit the transverse and lateral movement of journals in railway cars.

In the conventional railway freight car, the journal is free to move laterally and axially to a substantial extent. This makes it difficult to supply adequate lubrication to the journal and bearing and, to an even greater extent, makes it difficult to seal off the point of entry of the journal into the journal box.

At the point of entry of the journal into the journal box, it is conventional to apply a dust guard which is intended to prevent the entry of water, dust, dirt and other foreign matter into the journal box and similarly to prevent oil from leaking out of the journal box. Because of the axial and transverse movement of the journal, it has heretofore been impossible to provide a dust guard which will meet all of the operating conditions of the normal freight car.

Efforts have been made from time to time to provide means for limiting the axial and transverse movement of a railway car journal because when this movement is limited the remaining factors in proper journal lubrication and proper sealing of the journal box are greatly simplified. However, these efforts have not been entirely successful. These efforts have involved the application of continuous bearing members positioned along the sides of the journal. These continuous bearing members have had a serious disadvantage. Continuous bearing members wipe the oil from the journal so that the engagement of the journal with the normal journal brass has been unlubricated. Of course, this causes the journal to run hot and thereby results in hot boxes. Other efforts have been made to provide journal stops in which the journal engaging surface was provided with a plurality of vertical channels so that oil could pass through the channels and thus reach the journal brass. This latter type of journal stop has been reasonably successful but has had the serious disadvantage that it did not permit maximum, unrestricted oil flow at the area where lubrication was most important.

I have found that it is possible to provide a journal stop which will prevent undue transverse and axial movement of the journal without seriously interfering with proper lubrication of the journal and journal brass.

One of the objects of the present invention is to provide means for limiting the axial and transverse movement of a railway journal without interfering with proper lubrication.

A further object is to provide a railway journal stop which retains the waste or other lubricating packing in proper operating position.

A further object is to provide a railway journal stop which may be easily applied to existing journal boxes.

These and other objects and advantages reside in certain novel features of construction, arrangement and designs of parts will be more fully set out in appended claims.

Referring to the drawings:

FIGURE 1 is a longitudinal horizontal section of a journal box containing one form of journal stop of the present invention;

FIGURE 2 is a top plan view of the journal stop shown in FIGURE 1;

FIGURE 3 is a fragmentary section similar to FIGURE 1 illustrating a modified form of the stop;

FIGURE 4 is a section taken on line 4—4 of FIGURE 1;

FIGURE 5 is a vertical section showing a modified form of journal stop of the present invention;

FIGURE 6 is a vertical section similar to FIGURE 5 showing a further modified form of journal stop of the present invention.

In the conventional freight car, the journals extend into journal boxes and during the normal operation of the freight car, the journals can move longitudinally or axially, transversely and also angularly. These various movements displace the conventional lubricating waste, change the bearing relation between the journal and journal brass and tend to destroy the dust guard of the conventional journal box. By limiting the movement of the journal within the journal box, the journal bearing lubrication and the sealing of the journal box are simultaneously improved and many of the difficulties of lubrication and sealing are eliminated or vastly reduced.

It has also been found that the maximum angular movement of a railway car journal occurs close to the fillet and the collar and that if movement is limited in these two areas, the angular movement of the journal is restricted. Similarly it has been found that lubrication for a railway car journal is most essential and most effective at the center of the journal, roughly midway between the collar and fillet. At this point the pressure of the journal brass is greatest so that oil flow to this area should be unrestricted and an oil film on the journal at this central area will be squeezed toward the end of the journal and journal brass, thus giving relatively uniform lubrication along the entire length of the journal.

In the drawing, 10 designates a journal box which is carried by the conventional side frame (12 in FIGURE 5) of a railway car truck. This journal box has a top 14, side walls 16 and 18, a curved bottom 20, a front cover (not shown) and a dust guard well 22 at its rear end. A journal 24 extends through the dust guard well 22 into the journal box. This journal has a reduced bearing portion 26 between the fillet 28 and the collar 30. A bearing member 32 commonly known as the "brass" engages the top surface of the journal and a member 34 commonly known as the "wedge" is positioned between the brass and the top 14 of the journal box.

All of the foregoing parts are conventional and their design and construction are prescribed by A.A.R. standards and specifications. Their function and operation are so well known as to require no further description.

The journal stops of the present invention are rigidly secured one to each of the vertical sides 16 and 18 of the journal box and extend from the side walls of the journal box into close proximity to the reduced bearing portion 26 of the journal 24.

In the preferred form of the present invention shown in FIGURES 1 to 4, each journal stop member comprises two blocks 36 and 38 rigidly connected by an integral arm 40. Each block 36 and 38 may have a flat vertical journal engaging surface or may have a journal facing surface which is curved to engage the curve of the journal. The connecting arm may lie along the adjacent vertical wall of the journal box as shown at 41 in FIGURE 3 or may, as shown in FIGURES 1, 2 and 4 merely connect the two blocks 36 and 38 in such a way as to form a unitary member. Of course the two blocks 36 and 38 could be separate and independent but for ease and convenience of handling, application and removal, it is preferable that they be connected to form a unitary structure.

Each block 36 and 38 is provided with a tapped hole 42 so that bolts 44 extending through apertures 46 in the side wall of the journal box may secure the stop member rigidly into position. If desired, suitable gaskets not shown may be provided between the blocks 36 and 38 or bolts 44 of both, and the side walls of the journal box to prevent oil leakage out of the journal box.

The blocks 36 and 38 are of sufficient size to withstand the impact of the journal of a railway car in normal use, but are spaced sufficiently far apart so as not to interfere with the free flow of oil along the central portion of the journal. Blocks which extend about 1″ to 1½″ along the length of the journal have been found to be of sufficient size to withstand normal impacts. The blocks should ordinarily be of a suitable material, that is, a material softer than the steel of the journals. Brass, bronze, aluminum and even plastics such as Teflon and nylon are suitable for the blocks of the stop members.

FIGURE 5 shows a modified form of stop member according to the present invention. According to this modification a member 50 is secured by bolts 52 adjacent the top wall of the journal box. Each member 50 consists of a downwardly extending resilient wall or bracket 54 and a stop member 56 secured to the lower end of the bracket 54.

The bracket members 54 press the stops 56 into light, resilient contact with the reduced portion 26 of the journal adjacent the collar and fillet and when any transverse movement of the journal occurs, the stop members 54 strike the side walls 16 or 18 of the journal box thus limiting the transverse or angular movement of the journal.

It is well-known that railway car journals under impact do not move in a horizontal direction but move rather in a direction about 15 to 20 degrees off horizontal referred to generally as the 8 o'clock and 4 o'clock directions.

In the modification shown in FIGURE 6, the journal stops 60 are secured to the side walls 16 and 18 of the journal box in the 8 o'clock and 4 o'clock positions so that they receive the journal impact directly rather than at a slight angle. These stop members 60 are secured to the wide walls 16 and 18 of the journal box by bolts 62 and may be continuous or preferably positioned to engage the journal adjacent the collar and fillet in the same manner as the journal stops shown in FIGURES 1 to 4.

Some journal boxes are formed with longitudinal ribs which extend horizontally along the inner surfaces of the walls 16 and 18. When the journal stops of the present invention are used with a ribbed journal box, the journal box wall engaging surfaces of the journal stop are made to conform to the ribs so that the journal stop will solidly engage the wall of the box.

Preferably the clearance between the journal and the journal stops is small and as shown in FIGURE 1, the outer edges of the blocks 36 and 38 are close to the fillet 28 and collar 30 respectively. This minimizes transverse and axial movement of the journal. The blocks 36 and 38 are sufficiently spaced so that the major central area of the journal is freely lubricated and this lubricant is pressed out by the brass toward the ends of the journal.

Being close to the collar and fillet ends of the journal where displacement waste packing normally starts, the stops of the present invention also hold waste packing in position without extending over the entire surface of the packing. Of course, the journal stops of the present invention will hold other lubricating devices such as pads in their proper position.

From the foregoing, it will be apparent that I am able to attain the objects of my invention and provide a journal stop which will limit the axial, transverse and angular movement of a railway car journal without interfering with proper and adequate lubrication. Journal stops of the present invention engage the journal only at those areas where maximum lubrication is not essential while permitting full lubrication in the areas where bearing pressures are greatest.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A journal stop for limiting the lateral movement of a railway car journal within a journal box, said journal having a fillet and a collar, comprising a pair of impact blocks, one at each end of said stop, said blocks having spaced impact surfaces lying in substantially a common plane and a rigid and substantially straight reduced portion constituting the sole means connecting said blocks, the overall length of said stop between the outer edges of said impact surfaces being slightly less than the distance between said collar and fillet of said railway car journal, each of said impact surfaces extending from its outer edge in the direction of the other of said blocks less than ⅓ said overall length of said stop whereby said spaced impact surfaces do not interfere with the free flow of oil adjacent the center of said journal.

2. A journal stop as defined in claim 1 in which said impact blocks are provided with resilient arms secured to the rear faces of the blocks for urging said blocks toward said railway car journal and means for securing the resilient arms to said journal box.

3. In a railway car journal box having side, top and bottom walls and including a journal having a collar and fillet, journal stop means secured to the side walls of said journal box on each side of said journal, said journal stop means comprising a block having an impact face which extends less than one-third the length of the journal in the direction of the axis of the journal, said block being positioned adjacent the journal collar, a second block having an impact face which extends less than one-third the length of the journal in the direction of the axis of the journal positioned adjacent the journal fillet and a member of reduced cross section spaced from said journal rigidly connecting said blocks, said spaced member being the sole means connecting said blocks.

4. A railway car journal box having side, top and bottom walls and including a journal having a collar and fillet, journal stop means on each side of said journal approximately 15° below the horizontal axis of the journal, said journal stop means comprising a block having an impact face which extends less than one-third the length of the journal in the direction of the axis of the journal, said block being positioned adjacent the journal collar, a second block having an impact face which extends less than one-third the length of the journal in the direction of the axis of the journal positioned adjacent the journal fillet, a member spaced from said journal rigidly connecting said blocks, said member being spaced sufficiently from said journal to avoid contact therewith when said block and said second block come in contact with the journal, and means for rigidly securing said journal stop means to the walls of the journal box.

References Cited in the file of this patent

UNITED STATES PATENTS

| | | |
|---|---|---|
| 2,402,205 | Phelps | June 18, 1946 |
| 2,657,102 | Johnson | Oct. 27, 1953 |
| 2,684,878 | Foss | July 27, 1954 |
| 2,733,966 | Ryan | Feb. 7, 1956 |

FOREIGN PATENTS

| | | |
|---|---|---|
| 733,558 | France | June 11, 1932 |